United States Patent [19]
Azuma et al.

[11] 3,960,260
[45] June 1, 1976

[54] APPARATUS FOR AND METHOD OF CONVEYING AND HANDLING TIRE BEAD WIRES

[75] Inventors: Tosio Azuma, Higashimurayama; Hisashi Yonekawa, Kuroiso, both of Japan

[73] Assignee: Bridgestone Tire Company Limited, Kyoba, Japan

[22] Filed: Aug. 7, 1975

[21] Appl. No.: 602,741

[30] Foreign Application Priority Data
Aug. 8, 1974  Japan................................. 49-91018

[52] U.S. Cl............................... 198/19; 198/20 R; 198/82
[51] Int. Cl.²........................................ B65G 47/00
[58] Field of Search...................... 198/19, 20 R, 82

[56] References Cited
UNITED STATES PATENTS
2,958,639  11/1960  Laneyrie............................. 198/19

*Primary Examiner*—Evon C. Blunk
*Assistant Examiner*—Douglas D. Watts
*Attorney, Agent, or Firm*—Haseltine, Lake & Waters

[57] ABSTRACT

In the process of production of automobile tires, a tire bead wire is initially lifted onto an elevated conveyor and lowered from the conveyor to a tire bead wire working machine. The tire bead wire which is worked in the working machine is again lifted onto and conveyed by an additional elevated conveyor to a collecting position where the worked tire bead wire is joined to previously collected tire bead wires. When a predetermined number of tire bead wires are collected, they are conveyed to a following process.

16 Claims, 22 Drawing Figures

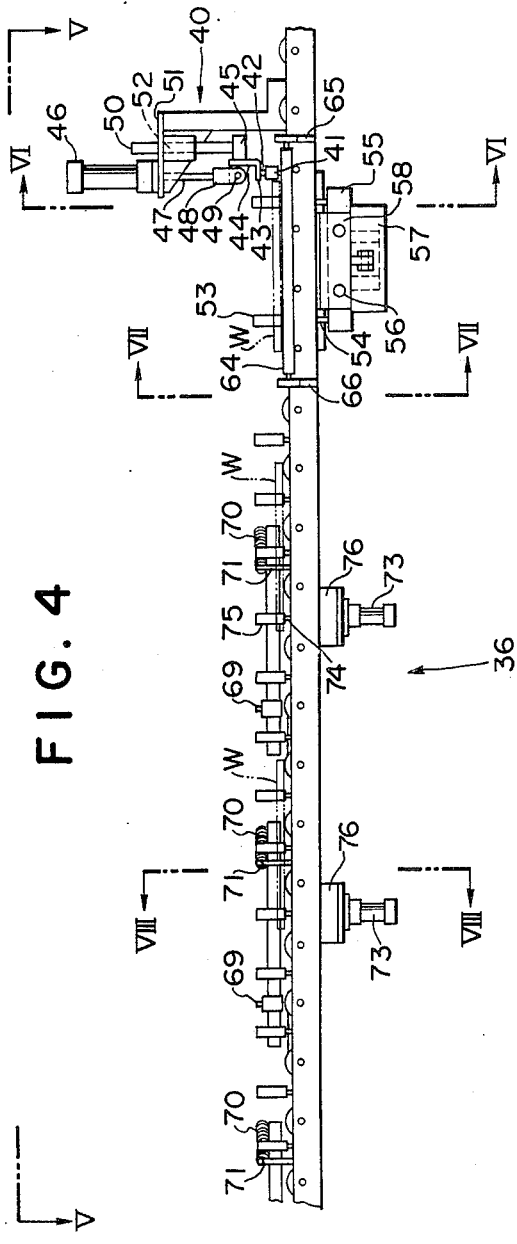
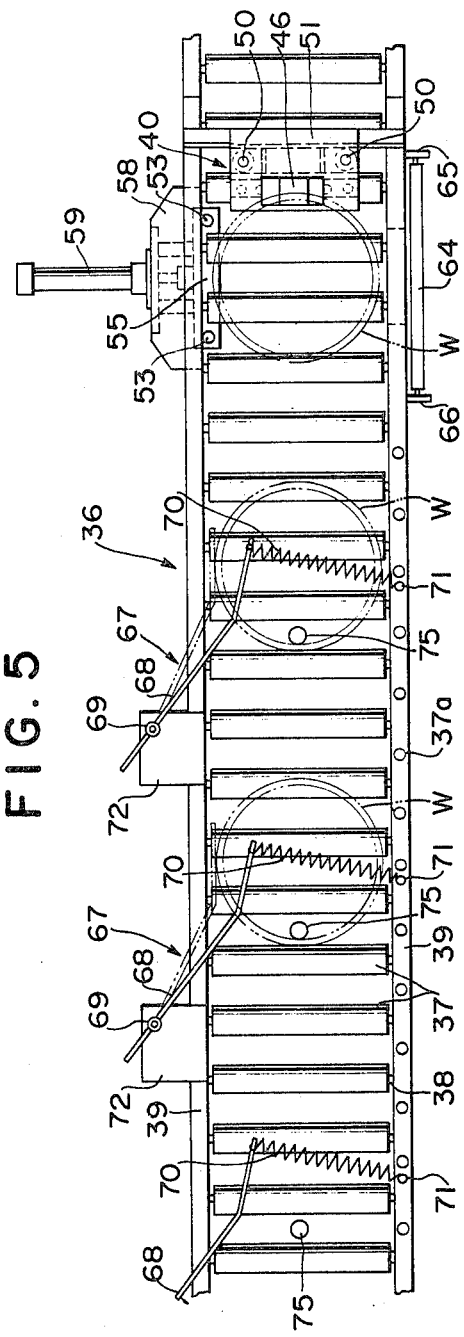
FIG. 4
FIG. 5

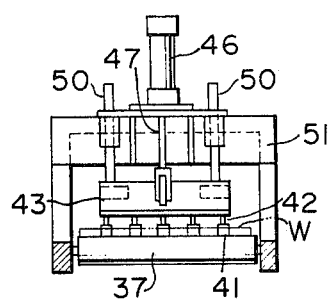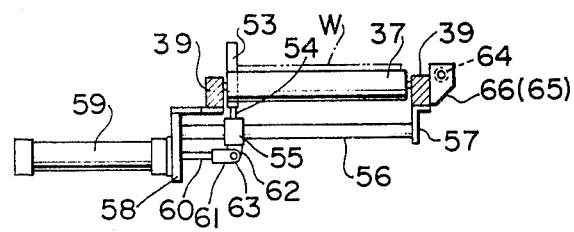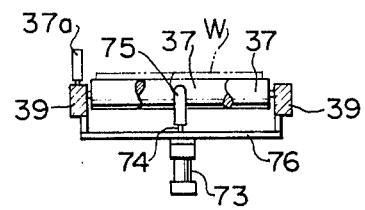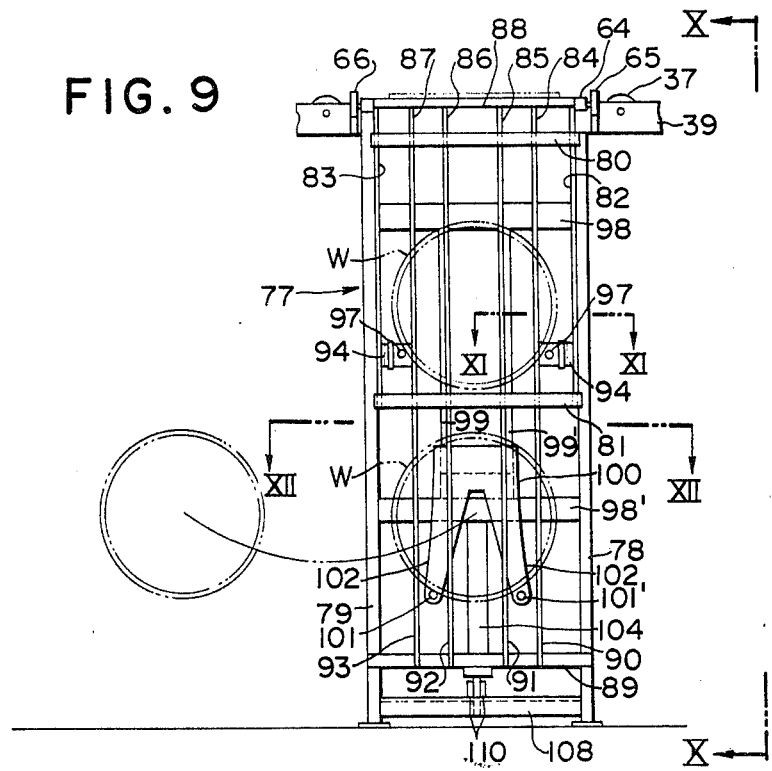

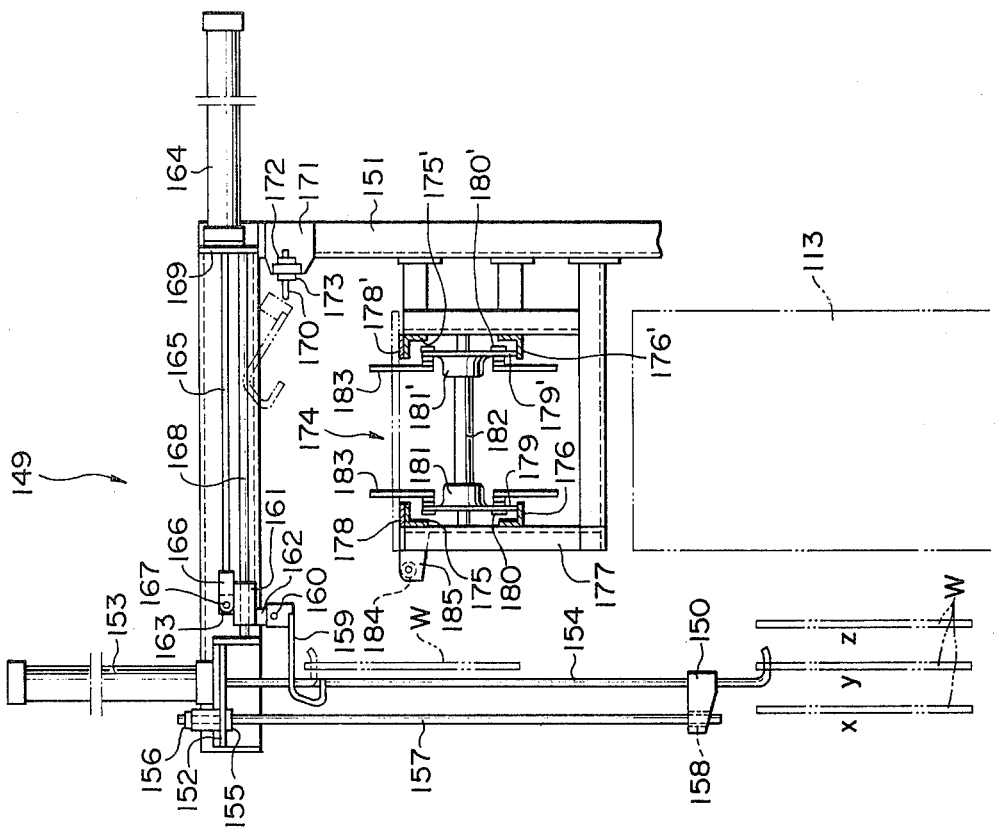
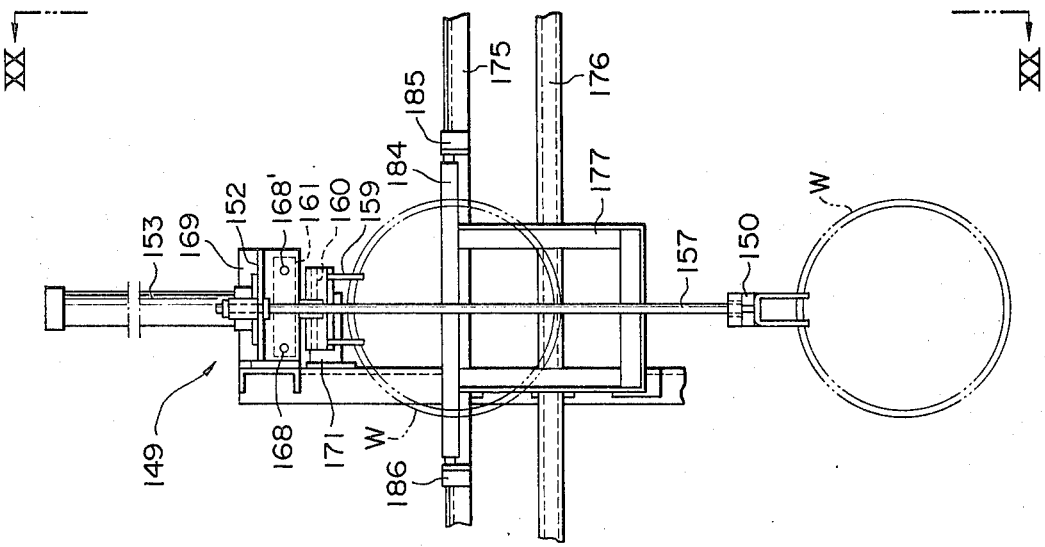

APPARATUS FOR AND METHOD OF CONVEYING AND HANDLING TIRE BEAD WIRES

The present invention relates to production of automobile tires and, more particularly, to an apparatus for and a method of conveying and handling tire bead wires in the production of automobile tires.

It is presently common practice to produce an original tire bead wire in such a manner that a sheet-like continuous layer of parallel wires covered with a rubber material is overlapped in a generally annular form, and then fastened at longitudinal ends by a suitable adhesive tape. Then, a continuous rubber-coated tape is wrapped around the newly formed loop of the original bead wire in a flipping process. On the outer periphery of the original tire bead wire is then applied a triangular cross-sectioned rubber strip, called an apex strip, or a rubber filler, called a filler or stiffner strip, where desired. A flipper cloth is finally wrapped entirely around the loop constituted by the resultant assembly of the tire bead wire and the rubber strip in the flipping process to produce a finished tire bead wire. The tire bead wire thus produced as in the above is then assembled into a green tire in a tire building process. The above operations require one or more operators to load and unload the original and finished bead wires onto and off the flipping apparatus from and onto pegs on a conveyor truck. During handling and conveying by operators, undesirable foreign materials adhere to and are entrapped in the finished tire bead wire, lowering the quality of the finished tire. Moreover, the operators are forced to repeat a simple and tedious task in the operations. Still further, a number of different trucks are required to be prepared for different tire bead wires in only one plant, which necessitates a large storage space for many trucks.

It is a primary object of the present invention to eliminate such drawbacks inherent in the prior art and to provide an apparatus for and a method of conveying and handling annular tire bead wires which will provide increased handling and conveying efficiency and contribute to elimination of the tedious and laborious operations which have thus far necessitated at the particular stage of production of the tire bead wires.

It is another object of the present invention is to provide an apparatus for and a method of conveying and handling annular tire bead wires which will require a reduced space to effectively arrange a variety of machines and devices in a plant without necessitating any truck for conveying the tire bead wires.

It is still another object of the present invention is to provide an apparatus for and a method of conveying and handling tire bead wires in which undesirable foreign materials are prevented from adhering to and being entrapped in the finished tire bead wire.

In accordance with the present invention, there will be provided to accomplish such an object an apparatus which comprises a first transfer mechanism including transfer means substantially vertically provided for picking up the tire bead wire with its rotational axis being substantially horizontal, and releasing means positioned in the vicinity of the upper portion of the transfer means for releasing the tire bead wire picked up to the upper portion of the transfer means therefrom; a first conveyor mechanism including a conveyor having one end positioned in the vicinity of and opposing to the releasing means of the first transfer mechanism for receiving the tire bead wire with its rotational axis being substantially vertical and for conveying the tire bead wire, and a plurality of stop means provided along the conveyor to be equal-distantly for temporally stopping the tire bead wire on the conveyor upon another tire bead wire occupying an immediately forward portion of the tire bead wire; at least a positioning mechanism provided substantially vertically for receiving and positioning the tire bead wire, with its rotational axis being substantially horizontal, fed from the conveyor of the first conveyor mechanism to a predetermined gripping position; at least a second transfer mechanism positioned in the vicinity of the positioning mechanism for gripping the tire bead wire at a predetermined gripping position of the positioning mechanism and for feeding it to a receiving position of a tire bead wire working machine; at least a third transfer mechanism including lifter means positioned in the vicinity of the working machine for receiving the tire bead wire from the working machine and for lifting it upwardly, and turning means positioned in the vicinity of the upper portion of the lifter means for receiving the tire bead wire from the lifter means and for turning the tire bead wire with its rotational axis being substantially vertical; at least a second conveyor mechanism having one end positioned in the vicinity of the turning means of the third transfer mechanism for receiving the tire bead wire from the turning means with its rotational axis being substantially vertical and for intermittently conveying it; and at least a collector and carrier mechanism including collector means positioned in the vicinity of the other end of the second conveyor mechanism for receiving the tire bead wire fed from the second conveyor mechanism and for collecting a plurality of tire bead wires, and carrier means for carrying a predetermined number of tire bead wires collected by the collector means.

On the other hand, the method in accordance with the present invention comprises transferring the tire bead wire one by one from a tire bead wire waiting position to a first conveyor mechanism disposed above the tire bead wire waiting position, temporally stopping the tire bead wire on the first conveyor mechanism for adjusting the timing of feeding the tire bead wire to a following process, transferring the tire bead wire on the first conveyor mechanism to a gripping position, holding the tire bead wire conveyed to the gripping position and transferring it to a receiving portion of a tire bead wire working machine for appropriately working the tire bead wire, receiving the tire bead wire from the working machine and transferring it to a second conveyor mechanism, conveying the tire bead wire to the end of the second conveyor mechanism by intermittently driving the second conveyor mechanism, collecting a predetermined number of tire bead wires conveyed to the end of the second conveyor mechanism onto a collector actuating correspondingly to the second conveyor mechanism, and carrying the tire bead wires collected on the collector to a following process.

The features and advantages of the apparatus and method according to the present invention will become more apparent from the following description taken in conjunction with the accompanying drawings, in which:

FIG. 4 is a side elevational view showing a first conveyor mechanism for conveying the tire bead wire received from the first transfer mechanism;

FIG. 5 is a plan view of the first conveyor mechanism as viewed from a position indicated by lines V—V of FIG. 4;

FIG. 6 is a front view, partly in section, of the stop mechanism for the tire bead wire taken on lines VI—VI of FIG. 4;

FIG. 7 is a view, partly in section, of the first conveyor mechanism taken on lines VII—VII of FIG. 4;

FIG. 8 is a view, partly in section, of the first conveyor mechanism taken on lines VIII—VIII of FIG. 4;

FIG. 9 is a front view showing a positioning mechanism for positioning the tire bead wire received from the first conveyor mechanism;

FIG. 19 is a side view showing a third transfer mechanism and a second conveyor mechanism;

FIG. 20 is a front view of the third transfer mechanism as viewed from a position indicated by lines XX—XX of FIG. 19;

Figure 1:
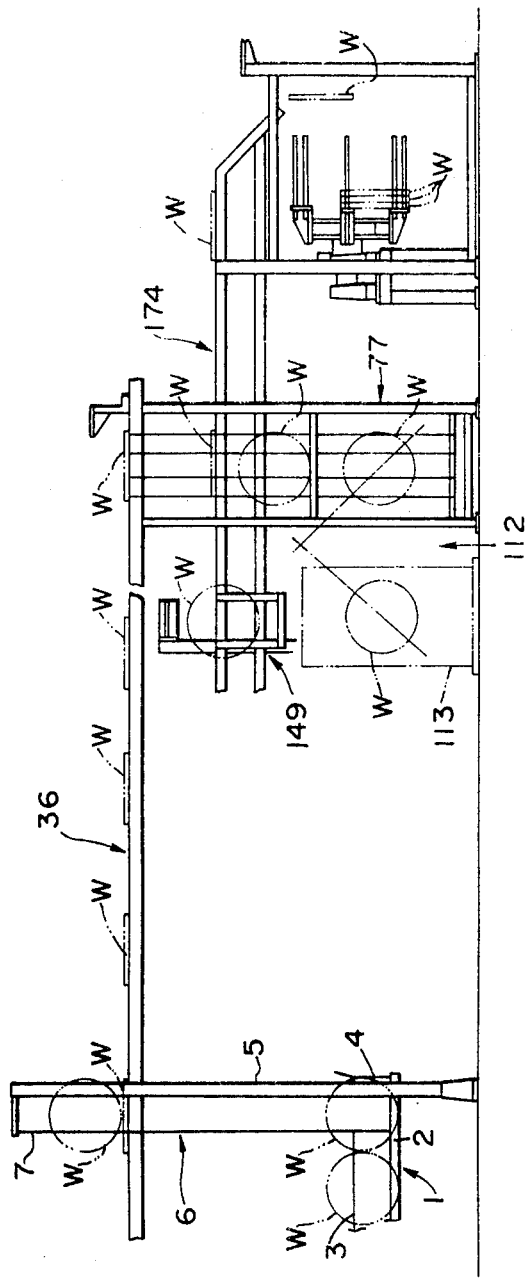
FIG. 1 is a schematic side elevational view of a preferred embodiment of the apparatus according to the present invention.

Reference will be made to the drawings, especially to FIGS. 1 to 3. The apparatus embodying the present invention is shown comprising a waiting conveyor 1, which includes a grooved guide frame 2, a pair of spaced guide rods 3 and 3' positioned above the guide frame 2 and in parallel with each other for guiding a tire bead wire W, and a stop member 4 provided at the end of the guide frame 2 so that the tire bead wire W rolls along and is guided by the guide frame 2 and the guide rods 3 and 3' until it is brought to a halt by means of the stop member 4 at the end of the guide frame 2 and is kept waiting for a short time. The waiting conveyor 1 is supported at one end by the lower portion of a frame 5. A first transfer mechanism 6 is shown comprising a pair of parallel spaced guide rods 7 which have upper ends securely connected to the upper end of the frame 5 and lower ends secured to the guide frame 2 but one of which is only shown in the drawings. A pair of parallel spaced guide rods 8 are positioned opposingly to the guide rods 7, respectively, to permit the tire bead wire W to be guided to the end of the waiting conveyor 1. A rotary shaft 10 is rotatably supported at one end in a cantilever fashion by bearings 11 and 12 mounted on the lower portion of the frame 5 and is adapted to carry at the other end a sprocket wheel 9. A rotary shaft 14 is also rotatably supported at one end in a cantilever fashion by bearings 15 and 16 mounted on the upper portion of the frame 5 and is adapted to carry at the other end sprocket wheels 13 and 20. An endless chain 17 is assembled with the sprocket wheels 9 and 13 and has two pegs 18 and 19 mounted thereon to be capable of picking up the tire bead wire W at the end of the guide frame 2 and to be positioned equally spaced from each other along the length thereof. An electric motor 22 with a brake has a rotary shaft 23 at the end of which a sprocket wheel 21 is carried. An endless chain 24 is assembled with the sprocket wheels 20 and 21 so that when the electric motor 22 is driven to rotate the sprocket wheel 21 through the rotary shaft 23 the sprocket wheel 9 is caused to rotate through the endless chain 24, the sprocket wheels 20 and 13 and the endless chain 17. A bifurcate lever member 25 has a lower end connected to one end of a pivotal axis 26 which is rotatably supported by bearings 27 and 28 mounted on the frame 5. A lever 29 has one end secured to the other end of the pivotal axis 26 and the other end pivotally connected by means of a pivotal pin 31 to a bracket 30 fixedly mounted on the leading end of a piston rod 33 of a fluid-operated cylinder 32. A bracket 35 is securely mounted on the upper portion of the frame 5 and is adapted to pivotally support the rear portion of the fluid-operated cylinder 32 through a pivotal pin 34. When the tire bead wire W is transferred to its uppermost position by each of the pegs 18 and 19 on the endless chain 17 and the fluid-operated cylinder 32 is actuated to cause the piston rod 33 to retract upwardly, the lever member 25 is rotated through the lever 29 to release the tire bead wire W from each of the pegs 18 and 19. The lever member 25 is thereafter returned to its initial position by the action of the fluid-operated cylinder 32.

Figure 2:
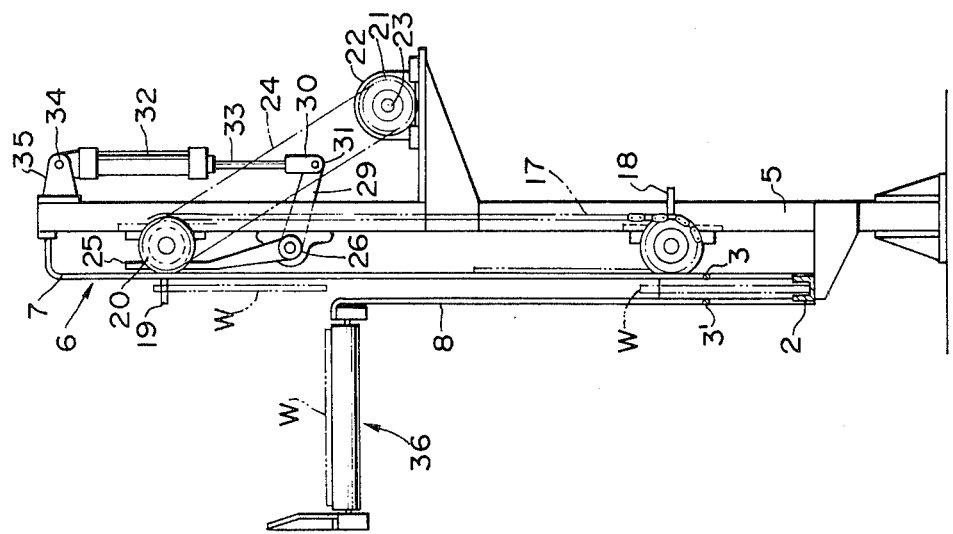
FIG. 2 is a side elevational view showing a first transfer mechanism for picking up the tire bead wire from a waiting conveyor mechanism of the embodiment illustrated in FIG. 1.
Figure 3:
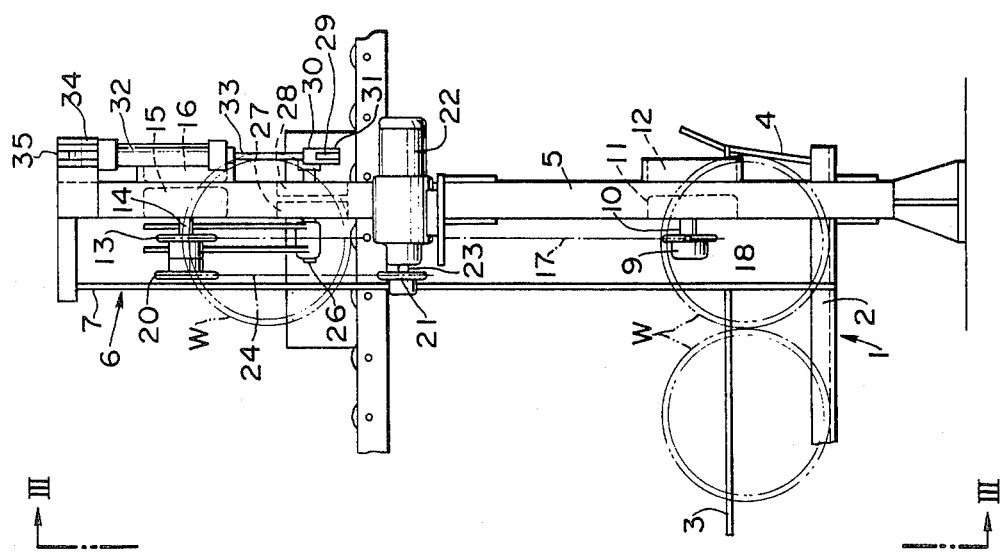
FIG. 3 is a front elevational view of the first transfer mechanism as viewed from a position indicated by lines III—III of FIG. 2.

A first conveyor mechanism 36 is provided above the waiting conveyor 1 as shown in FIGS. 1 to 3 to receive the tire bead wire W released from the pegs 18 and 19 by the lever member 25, and is constituted as shown in FIGS. 4 and 5. The first conveyor mechanism 36 is shown comprising a multiplicity of parallel spaced conveyor rollers 37 each having a rotary shaft 38 rotatably mounted on parallel spaced frames 39. The conveyor rollers 37 are driven to rotate by a driving mechanism (not shown) in such a way that only several rollers which are held in contact with the stopped tire bead wire W are not caused to rotate while the remaining conveyor rollers 37 which are held in contact with no tire bead wire W are caused to rotate. The conveyor rollers 37 are thus so constituted as to be rotated only when no load of the tire bead wire W is given to the conveyor rollers 37. Stop mechanism 40 is provided over the first transfer conveyor 36 to stop the tire bead wire W on the conveyor mechanism 36. The stop mechanism 40 is shown in FIGS. 4 to 6 comprising a plurality of vertical rollers 41 which are so positioned as to be engageable with the outer periphery of the tire bead wire W and which are rotatably supported by depending respective rods 42 securely mounted on a horizontal bracket 43. The bracket 43 has a front projection 44 mounted on the front face thereof and a pair of rear projections 45 mounted on the rear face thereof. A fluid-operated cylinder 46 is vertically mounted on the upper portion of a bracket 51 and has a piston rod 47 at the leading end of which is securely mounted a bracket 48 pivotally connected to the front projection 44 of the bracket 43 through the pivotal pin 49 so that the bracket 43 is moved upwardly and downwardly with the action of the fluid-operated cylinder 46. A pair of guide rods 50 are connected at their lower ends to the rear brackets 45 and have upper portions extending through a pair of guide apertures 52 to guide the bracket 43 in a vertical direction. A pair of urging rollers 53 are vertically rotatably supported by respective vertical rods 54 securely mounted on a horizontally movable member 55 as best shown in FIG. 7. The movable member 55 is adapted to be guided by a pair of guide rods 55 which have both ends securely connected to downwardly extending brackets 57 and 58, respectively, on the frames 39 to be in parallel with each other. A fluid-operated cylinder 59 is horizontally attached to the bracket 58 and has a piston rod 60 on the leading end of which is securely mounted a bracket 61 pivotally connected to a downwardly projecting projection 62 by a pivotal pin 63. A guide roller 64 is rotatably supported on a pair of brackets 65 and 66 fixedly mounted on the frame 39 opposing to the fluid-operated cylinder 59 in such a manner that it has an upper circumferential plane substantially the same as that of the roller 37.

Referring back to FIGS. 5 and 6, a plurality of tire bead wire W temporally stopping mechanisms 67 are provided on and along one of the frames 39 to be equidistantly spaced apart from each other. Each of the mechanisms 67 is shown comprising a detection lever 68 pivotally mounted through a pivotal pin 69 on a base member 72 securely mounted on the side of one of the frames 39, a tension spring 70 having one end connected to the forward end of the detection lever 68 and the other end fastened to one of fastening rods 71 mounted on the other frame 39, and a stopping rod 75 projectable between the rollers 37 and securely mounted on a piston rod 74 of a fluid-operated cylinder 73. A base member 76 is fixedly connected to the lower surfaces of the frames 39 to support the fluid-operated cylinder 73 as particularly shown in FIG. 8. A plurality of parallel spaced vertical guide rollers 37a are rotatably mounted on the other frame 39 to prevent the tire bead wire W from dropping down out of the conveyor rollers 37. When the tire bead wire W is detected by the immediately forward detection lever 68, the fluid-operated cylinder 73 is actuated to project the piston rod 74 upwardly so that the stopping rod 75 is extended through the upper plane of the conveyor rollers 37 and inserted through the tire bead wire W, causing stoppage therefor. When, on the other hand, no tire bead wire W is detected by the immediately forward detection lever 68, the fluid-operated cylinder 73 is actuated to retract the piston rod 74 to permit the tire bead wire W to pass over the stopping rod 75 while the detection lever 68 being moved outwardly and the forward tension spring 70 being also urged by the moving tire bead wire W.

Figure 10:
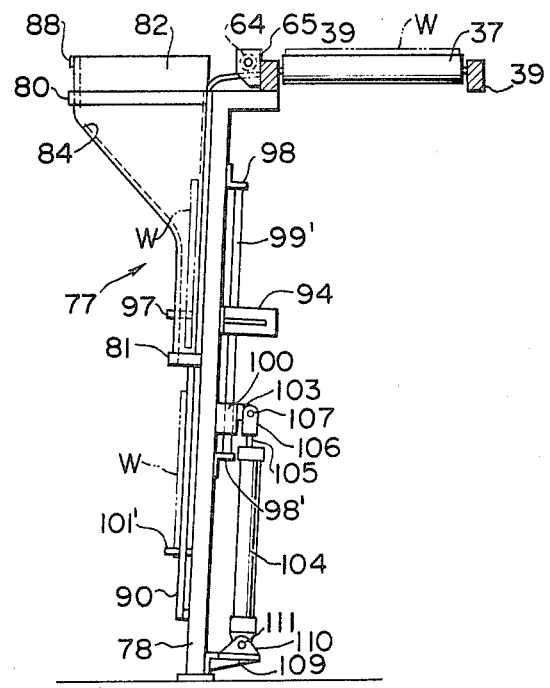
FIG. 10 is a side view of the positioning mechanism as viewed from a position indicated by lines X—X of FIG. 9.
Figure 11:
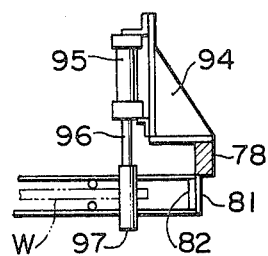
FIG. 11 is a view, partly in section, taken on lines XI—XI of FIG. 9.
Figure 12:
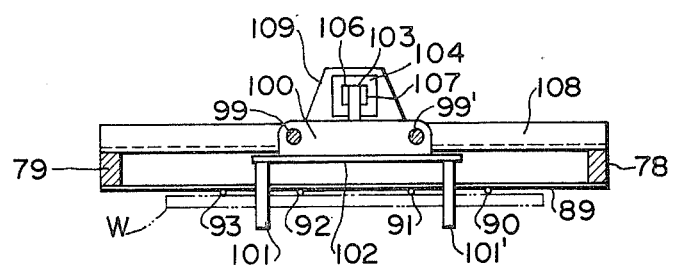
FIG. 12 is a view, partly in section, taken on lines XII—XII of FIG. 9.
Figure 13:
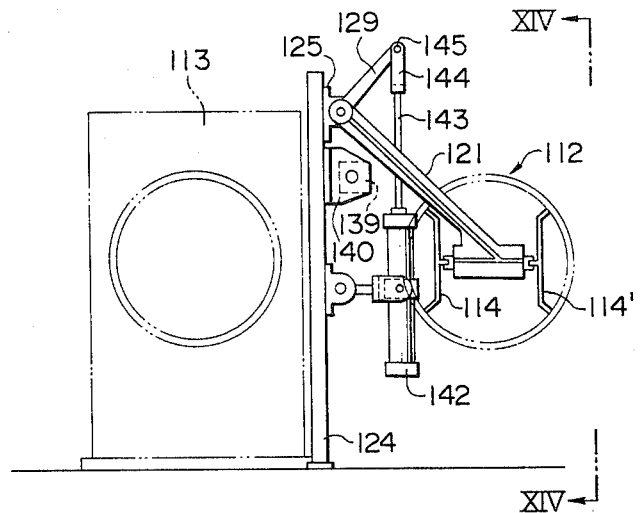
FIG. 13 is a front view showing a second transfer mechanism for transferring the tire bead wire received from the positioning mechanism onto a tire bead wire working machine.
Figure 15:
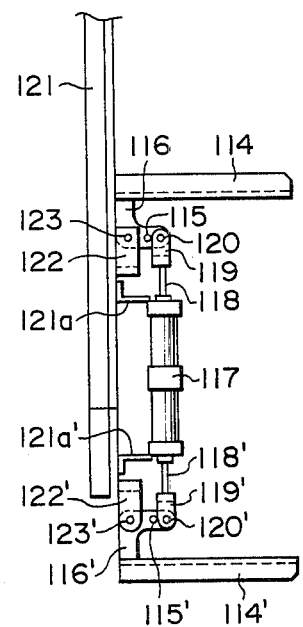
FIG. 15 is an enlarged view taken on lines XV—XV of FIG. 14, showing bead holding means.
Figure 14:
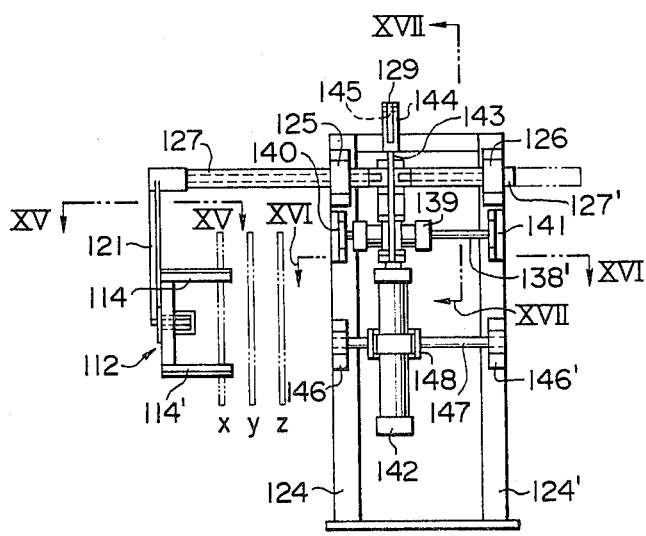
FIG. 14 is a side view of the second transfer mechanism as viewed from a position indicated by lines XIV—XIV of FIG. 13.
Figure 16:
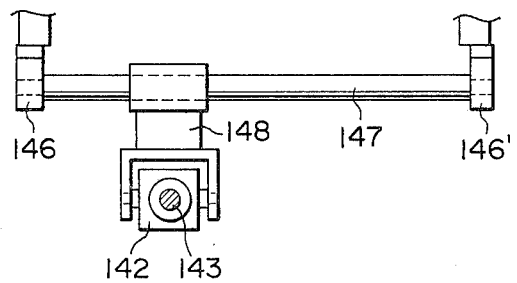
FIG. 16 is an enlarged view taken on lines XVI—XVI of FIG. 14.

In FIGS. 9 and 10, a positioning mechanism 77 is provided substantially vertically and positioned at the side of the frame 39 to receive the tire bead wire W fed from the conveyor rollers 37 and to position it at a predetermined gripping position with its rotational axis under a substantially horizontal condition. The positioning mechanism 77 is shown comprising a pair of vertical frames 78 and 79 which are horizontally spaced apart from each other and each of which has an upper end securely connected to the lower portion of the frame 39 and a lower end securely mounted on a floor. A pair of beam members 80 and 81 which are vertically spaced apart from each other are connected at their both ends to the vertical frames 78 and 79 and have a pair of side plates 82 and 83 at their both sides. Each of the side plates are so contoured as to have an upper portion with greater width and a lower portion with shorter width as particularly shown in FIG. 10. Guide rods 84 to 87 are horizontally spaced apart from each other and have upper end portions rigidly connected to the beam member 80 and lower ends rigidly connected to the beam member 81 so as to be curved along the front edges of the side plates 82 and 83. A reinforcing member 88 is horizontally attached to the upper ends of the guide rods 84 to 87. A front beam 89 is bridged between the lower portion of the vertical frames 78 and 79. Guide rods 90 to 93 are horizontally spaced apart from each other and are securely connected at their upper ends to the frame 39 and at their lower ends to the front beam 89. A pair of brackets 94 are securely connected to the rear faces of the frames 78 and 79, respectively, and are adapted to support fluid-operated cylinders 95, respectively, as shown in FIG. 11. Each of the fluid-operated cylinders 95 has a piston rod 96 to the leading end of which is attached a receiving member 97 for temporally receiving the tire bead wire W. A horizontal back beam 98 and 98' are vertically spaced apart from each other and have both ends securely connected to the back faces of the frames 78 and 79. A pair of guide rods 99 and 99' are horizontally spaced apart from each other and have upper ends fixedly connected to the upper back beam 98 and lower ends fixedly connected to the lower back beam 98'. A furcate slider 100 is vertically slidably coupled with the guide rods 99 and 99' and adapted to support a pair of receiving rods 101 and 101' at their furcate lower ends. The horizontal width between the receiving rods 101 and 101' is smaller than the width between the receiving members 97. A projection 103 is formed at the rear face of the slider 100. A fluid-operated cylinder 104 has a piston rod 105 to the leading end of which is attached a bracket 106 pivotally connected to the projection 103 through a pivotal pin 107 and has a lower end pivotally connected to a projection 110 through a pivotal pin 111. The projection 110 is vertically mounted on a horizontal plate 109 which is formed on the rear face of a back lower beam 108 securely mounted on the lower portions of the vertical frames 78 and 79. When the fluid-operated cylinder 104 is actuated to cause the piston rod 105 to project upwardly and downwardly, the slider 100 is caused to move upwardly and downwardly so that the tire bead wire W on the receiving members 97 is received on the receiving rods 101 and 101' and then moved downwardly to a predetermined gripping position.

A second transfer mechanism 112 is located in the vicinity of the positioning mechanism 77 to grip the tire bead wire W at a predetermined gripping position of the positioning mechanism and to feed it to a receiving position of a tire bead wire working machine 113 in which various works are carried out such as for applying an apex strip on the outer periphery of the annular tire bead wire W, for covering a flipper cloth around the loop constituted by the resultant assembly of an original tire bead wire and the apex strip, and for the like. There will not be particularly described hereinafter nor shown in the drawings about the constitution and operation of the working machine 113 since the present invention is aimed at loading and unloading the tire bead wire W on and from the working machine 113 but not aimed at the working machine 113 itself.

The second transfer mechanism 112 is shown in FIGS. 13 to 18 comprising a pair of bead holding members 114 and 114' which are to engage the inner periphery of the tire bead wire W for its holding. The holding members 114 and 114' have at their rear ends crank arms 116 and 116', respectively, which are in turn formed with slots 115 and 115', respectively. A double acting fluid-operated cylinder 117 has a pair of piston rods 118 and 118' which are adapted to carry at their forward ends brackets 119 and 119', respectively. A pair of pins 120 and 120' are securely mounted on the respective tops of the brackets 119 and 119' to engage the slots 115 and 115', respectively, of the crank arms 116 and 116'. The double acting fluid-operated cylinder 117 is carried by a swingable arm 121 by way of a pair of brackets 121a and 121a' spaced apart from each other along the length of the swingable arm 121. A pair of brackets 122 and 122' are securely mounted outwardly of the brackets 121a and 121a' on the swingable arm 121 and are adapted to pivotally support the crank arms 116 and 116', respectively, through a pair of pivotal pins 123 and 123' so that the bead holding members 114 and 114' are actuated to pivot around the pivotal pins 123 and 123' when the double acting fluid-operated cylinder 117 is actuated to cause the piston rods 118 and 118' to project forwardly and retract backwardly. The holding members 114 and 114' thus serve to hold the tire bead wire W on the outer faces thereof and to release it therefrom. On the other hand, the swingable arm 121 is supported by one end of a swingable shaft 128 which is accommodated in a horizontal hollow shaft 127. A bearing 125 is attached to the upper portion of an upstanding post 124 and horizontally slidably supports the hollow shaft 127 in a cantilever fashion. An additional horizontal hollow shaft 127' is also horizontally slidably supported by a bearing 126 in a cantilever fashion to be in coaxial relation with the hollow shaft 127 and accommodates therein an additional swingable shaft 128' in coaxial relation with the swingable shaft 128. The bearing 126 is also attached to the upper portion of an additional upstanding post 124' which is aligned with the post 124. A lever 129 is securely connected at one end to the other end of the swingable shaft 128 by means of a key 130 and a snap ring 131. The other end portion of the swingable shaft 128 is rotatably engaged with a bushing 132 which is attached to the inner periphery of the hollow shaft 127. A bearing 133 is provided on the upper portion of a movable member 135 to hold both the ends of the hollow shafts 127 and 127'. An opening 134 is formed in the central portion of the bearing 133 to allow the lever 129 to swing freely over an angle of 180 degrees. A double acting fluid-operated cylinder 139 is horizontally mounted on the lower portion of the movable member 135 through a pair of brackets 136 and 137 and has a pair of piston rods 138 and 138' the leading ends of which are secured to brackets 140 and 141 mounted on the posts 124 and 124', respectively. When the fluid-operated cylinder 139 is actuated to cause the piston rods 138 and 138' to project and retract, the hollow shafts 127 and 127' are caused to move forwardly and backwardly so that the second transfer mechanism 112 is moved toward and away from the tire bead wire working machine 113. A vertical fluid-operated cylinder 142 has a piston rod 143 to the leading end of which is attached a bracket 144 pivotally connected to the other end of the lever 129 through a pivotal pin 145. A pair of bearings 146 and 146' are mounted on the posts 124 and 124', respectively, and support the both ends of a horizontal guide shaft 147. A sliding member 148 is slidably mounted on the guide shaft 147 and pivotally supports the fluid-operated cylinder 142. When the fluid-operated cylinder 142 is actuated to cause the piston rod 143 to project upwardly and retract downwardly, the swingable arm 121 is pivoted around the swingable shaft 128 through the lever 129 so that the second transfer mechanism 112 is caused to swing in parallel with the front face of the tire bead wire working machine 113.

A third transfer mechanism 149 is provided in the vicinity of the working machine 113 for receiving the tire bead wire W appropriately worked and kicked out by the working machine 113 in FIG. 1. The detailed structure of the third transfer mechanism 149 will be described hereinafter with reference to FIGS. 19 and 20. The third transfer mechanism 149 is shown comprising a furcate hook member 150 positioned opposing to and spaced apart from the front face of the working machine 113 to receive the tire bead wire W from the working machine 113. A fluid-operated cylinder 153 is vertically mounted on a bracket 152, which is securely mounted on a L-shaped support member 151, and has a piston rod 154 the leading end of which is connected to the hook member 150. A guide rod 157 is arranged in parallel with the piston rod 154 and has an upper end securely connected to the bracket 152 by means of a pair of nuts 155 and 156 and an lower end slidably inserted through an aperture 158 formed at the rear portion of the hook member 150. When the hook member 150 receives the tire bead wire W kicked out of the working machine 113, the fluid-operated cylinder 153 is actuated to cause the piston rod 154 to retract upwardly so that the tire bead wire W is moved upwardly without the hook member 150 being rotated around the guide rod 157. A pair of horizontal guide rods 168 and 168' are rigidly connected at their both ends to the bracket 152 and a bracket 169 mounted on the support member 151 in parallel with each other, and slidably engage a slider 161. A fluid-operated cylinder 164 is horizontally mounted on the bracket 169 and has a piston rod 165 to the leading end of which is attached a bracket 166 pivotally connected through a pivotal pin 167 to a projection formed on the upper surface of the slider 161. A furcate hook member 159 has a rear end pivotally connected through a pivotal pin 160 to an additional projection 162 formed on the lower surface of the slider 161. A lug 170 is fastened to the bracket 171 by means of a pair of nuts 172 and 173 so as to horizontally be disposed below the fluid-operated cylinder 164. When the hook member 150 is moved to its uppermost position under a condition that the hook member 159 is moved to its leftmost position as shown in FIG. 20, the fluid-operated cylinder 164 is actuated to cause the piston rod 165 to retract so that the slider 161 and the hook member 159 are caused to move rightwardly, whereupon the hook member 159 receives the tire bead wire W from the hook member 150. When the hook member 159 is then moved to its rightmost position, the tire bead wire W is released from the hook member 159 since it is pivoted about the pivotal pin 160 upon engagement with the lug 170 as shown in phantom lines in FIG. 20. An idle roller 184 is rotatably mounted on a pair of brackets 185 and 186, which will be particularly described hereinlater, opposing to and in the vicinity of the guide rod 157 and serves to easily release the tire bead wire W from the hook member 159 to turn the axis thereof into a substantially vertical condition when the hook member 159 is engaged with the lug 170. The turning means for turning the tire bead wire W is constituted as a whole by the hook member 159, the slider 161, the guide rods 168 and 168', the fluid-operated cylinder 164, the lug 170 and the idle roller 184.

Figure 21:
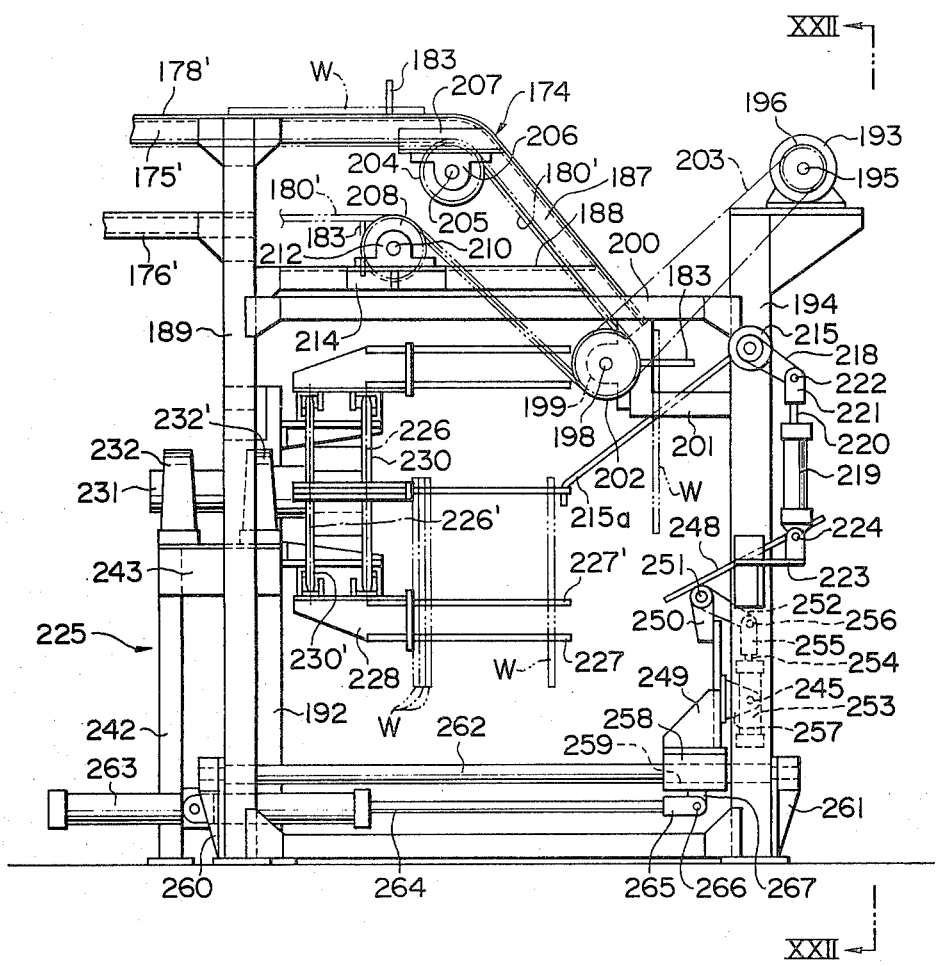
FIG. 21 is a side view showing a collector and carrier mechanism.

A second conveyor mechanism 174 is provided to have one end positioned in the vicinity of the turning means and below the guide rods 168 and 168' to convey the tire bead wire W to a following process. The second conveyor mechanism 174 will be described hereinafter with reference to FIGS. 19 to 22. The second conveyor mechanism 174 is shown comprising a pair of upper frames 175 and 175' which are horizontally spaced apart from and in parallel with each other, and a pair of lower frames 176 and 176' which are disposed below the upper frames 175 and 175' to horizontally be spaced apart from and in parallel with each other. The frames 175, 175', 176 and 176' are rigidly connected to the support member 151 by means of a bracket 177. A pair of plate members 178 and 178' each of which is formed from a synthetic resin or the like are mounted on the upper surfaces of the upper frames 175 and 175', respectively, to provide smooth sliding for the tire bead wire W. The lower frames 176 and 176' have rails 179 and 179' horizontally projecting inwardly thereof to support a pair of endless chains 180 and 180'. A pair of sprocket wheels 181 and 181' are keyed or otherwise securely connected to a rotary shaft 182 in spaced relation with each other along the axis of the rotary shaft 182 for engaging the endless chains 180 and 180', respectively. The rotary shaft 182 has both ends which are rotatably mounted on the lower frames 176 and 176' through bearings (not shown). Each of the endless chains 180 and 180' has on its outer surface a plurality of pegs 183 which are engageable with the inner periphery of the tire bead wire W. The brackets 185 and 186 which serve to rotatably support the idle roller 184 are securely mounted on the side of the upper frame 175. In FIG. 21, the upper frames 175 and 175' have inclined portions 187 at the other ends and are supported by a pair of horizontal beams 188 one of which is only shown in the drawings. One of the beams 188 is supported by a vertical post 189, while the other beam 188 is supported by a vertical post 190 (see FIG. 22). The post 190 is supported by a horizontal beam 191 one end of which is securely connected to the side of the post 189 and the other end of which is securely connected to an upstanding post 192 (see FIGS. 21 and 22). An electric motor 193 with a brake is mounted on the upper end of a frame 194 and has a rotary shaft 195 carrying a sprocket wheel 196 keyed thereto. The electric motor 193 is so constituted as to intermittently rotated. A pair of sprocket wheels 197 and 197' for driving the endless chains 180 and 180' are securely mounted on a rotary shaft 198 both ends of which are rotatably supported by bearings 199. A pair of brackets 201 only one of which is shown in the drawings are securely mounted on the frame 194 and beams 200, and are positioned below the beams 200 to support the bearings 199. A sprocket wheel 202 is keyed to one end of the rotary shaft 198 and has driving connection with the sprocket wheel 196 through an endless chain 203. A pair of idle sprocket wheels 204 only one of which is shown in FIG. 21 are horizontally spaced apart from and opposing to each other and are keyed to a rotary shaft 205 rotatably supported by bearings 206 mounted on the upper frames 175 and 175' through brackets 207 to guide the endless chains 180 and 180'. A pair of idle sprocket wheel 208 only one of which is shown in FIG. 21 are horizontally spaced apart from and opposing to each other and are keyed to respective rotary shafts 209 and 210 which are disposed in coaxial relation with each other. The rotary shafts 209 and 210 are rotatably supported by respective bearings 211 and 212 which are mounted on brackets 213 and 214, respectively. When the electric motor 193 is rotated, the endless chains 180 and 180' are intermittently driven through the sprocket wheel 196, the chain 203, the sprocket wheel 202, the rotary shaft 198 and the sprocket wheels 197 and 197'.

A rotary shaft 216 has both ends rotatably supported by a pair of bearings 217 and 217' securely mounted on the upper portion of the frame 194. A bushing 215 is keyed to the rotary shaft 216 and has a pair of guide rods 215a and 215b. A lever 218 is keyed at one end to an extension of the rotary shaft 216 and has the other end which is pivotally connected through a pivotal pin 222 to a bracket 221 which is attached to the leading end of a piston rod 220 of the fluid-operated cylinder 219. A bracket 223 is secured to the side of the frame 194 and pivotally connected to the rear end of the fluid-operated cylinder 29 through a pivotal pin 224. When the tire bead wire W is conveyed to the other end of the second conveyor mechanism 174 and the endless chains 180 and 180' are brought to a halt, the fluid-operated cylinder 219 is actuated to cause the piston rod 220 to retract downwardly so that the guide rods 215a and 215b are pivoted upwardly around the rotary shaft 216 through the lever 218 until the forward ends of the guide rods 215a and 215b are engaged with the tire bead wire W. Thereafter, when the electric motor 193 is rotated to drive the second conveyor mechanism 174, the guide rods 215 a and 215b receive the tire bead wire W from the pegs 183 of the second conveyor mechanism 174. When the fluid-operated cylinder 219 is actuated to cause the piston rod 220 to project upwardly, the guide rods 215a and 215b are pivoted downwardly around the rotary shaft 216 through the lever 218 so that the tire bead wire W slides down on the guide rods 215a and 215b.

Figure 22:
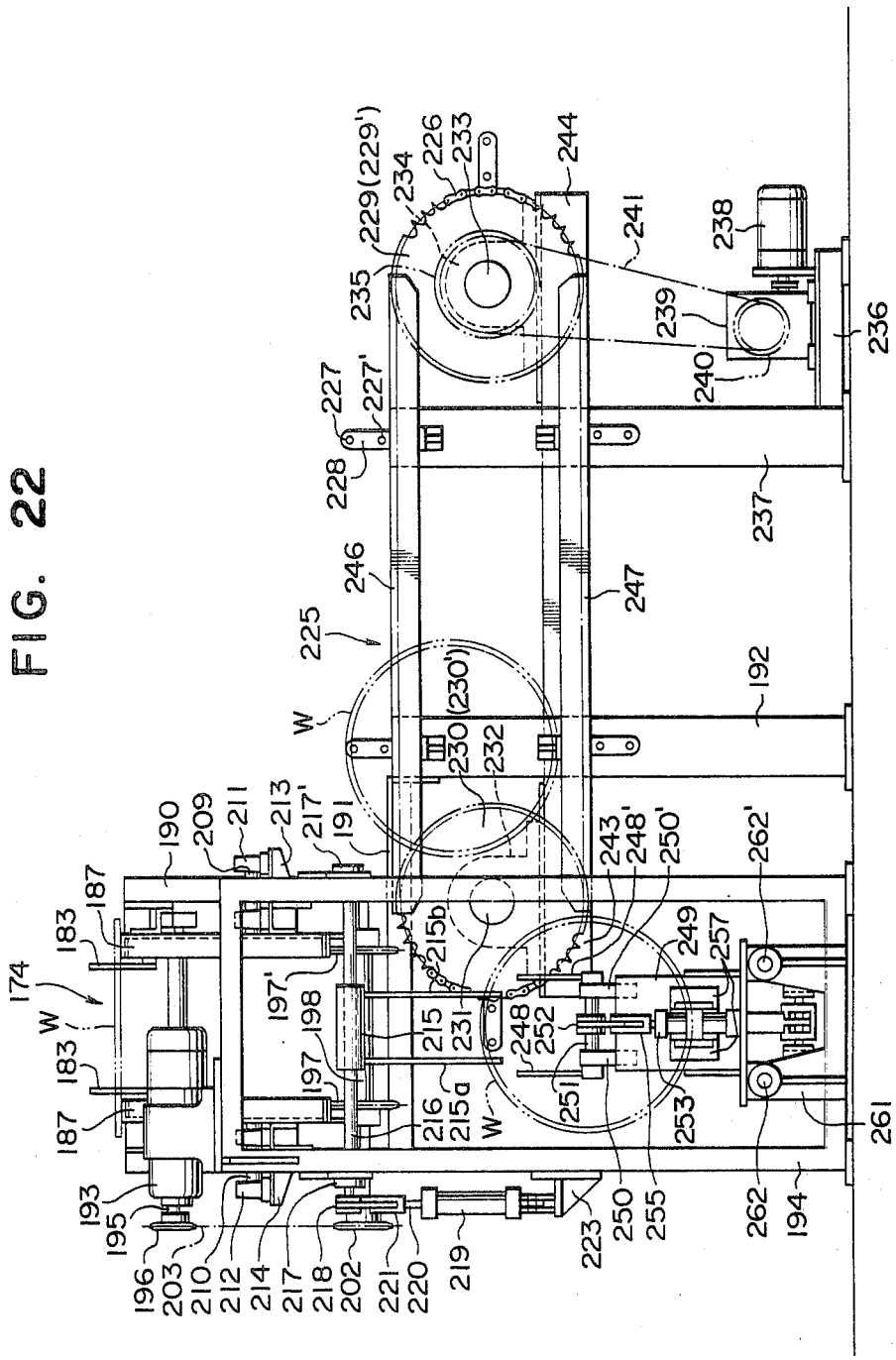
FIG. 22 is a front view as viewed from a position indicated by lines XXII—XXII of FIG. 21.

A collector mechanism 225 is provided in front of the guide rods 215a and 215b and below the other end of the second conveyor mechanism 174 to receive and collect the tire bead wires W sliding down on the guide rods 215a and 215b in FIGS. 21 and 22. A pair of endless chains 226 and 226' are provided in parallel with and horizontally spaced apart from each other and have at their outer peripheries a plurality of brackets 228 equi-distantly mounted thereon. The endless chain 226 is passed on a pair of sprocket wheels 229 and 230, while the endless chains 22 are passed on a pair of sprocket wheels 229' and 230'. Each of the brackets 228 has a pair of spaced supporting rods 227 and 227' extending in parallel with the axes of the sprocket wheels 229, 229' and 230, 230' to carry thereon collected tire bead wires W received from the guide rods 215a and 215b. A rotary shaft 231 has one end keyed to the sprocket wheels 230 and 230' and the other end rotatably supported by bearings 232 and 232'. A rotary shaft 233 has one end keyed to the sprocket wheels 229, 229' and the other end pivotally supported by bearings 234. The rotary shaft 233 carries an additional sprocket wheel 235 which is driven by an electric motor which will be described hereinlater. In the vicinity of the lower end of a post 237 is provided a bracket 236 on which are mounted an electric motor 238 with a brake and a reduction gear unit 239 in driving connection with the electric motor 238. The electric motor 238 is so constituted as to intermittently be rotated. On an output shaft of the reduction gear unit 239 is securely mounted a sprocket wheel 240 which is drivably connected with the sprocket wheel 235 through an endless chain 241. A base structure 242 is provided at the rear side of the post 192 to support a bracket 243 on which the bearings 232 and 232' for supporting the rotary shaft 231. A bracket 244 is supported in the same horizontal plane as the bracket 243 by the posts 192 and 237, and carries thereon the bearing 234 for rotatably supporting the rotary shaft 233. A pair of chain guides 246 and 247 are securely connected to the posts 192 and 237 to be vertically spaced apart from and in parallel with each other for guiding the endless chains 226 and 226'. A pair of swing levers 248 and 248' are provided below the guide rods 215a and 215b and securely connected to the both ends of a rotary shaft 251 which is rotatably supported by a pair of spaced brackets 250 and 250' securely connected to a slider 249. A lever 252 has one end rigidly connected to the intermediate portion of the rotary shaft 251 and the other end pivotally connected through a pivotal pin 256 to a bracket 255 which is attached to the leading end of a piston rod 254 of a vertical fluid-operated cylinder 253. On the rear surface of the bracket 249 is mounted a bracket 257 which pivotally supports the fluid-operated cylinder 253 through a pivotal pin 245. A depending member 258 is secured to the bottom face of the bracket 249 and has a pair of bores 259 through which a pair of guide rods 262 and 262', respectively, are inserted. The both ends of the guide rods 262 and 262' are supported by a pair of brackets 260 and 261 which are provided at the lower end portions of the post 189 and the frame 194. A fluid-operated cylinder 263 is horizontally mounted on the bracket 260 and has a piston rod 264. A bracket 265 is attached to the leading end of the piston rod 264 and pivotally connected to a bracket 267 formed on the bottom face of the depending member 258. When supporting rods 227 and 227' receive a tire bead wire W from the guide rods 215a and 215b, the fluid-operated cylinder 253 is actuated to cause the piston rod 254 to project upwardly so that the swing levers 248 and 248' are swung to a vertical condition through the lever 252, while the fluid-operated cylinder 263 is actuated to cause the piston rod 264 to retract backwardly so that the swing levers 248 and 248' are moved toward the bracket 228. The tire bead wire W is thus pushed toward the bracket 228 to join the tire bead wires W which are already received on the supporting rods 227 and 227'.

The operation to convey and handle the tire bead wire W in the apparatus thus constructed and arranged will now be described hereinafter.

Figure 18:
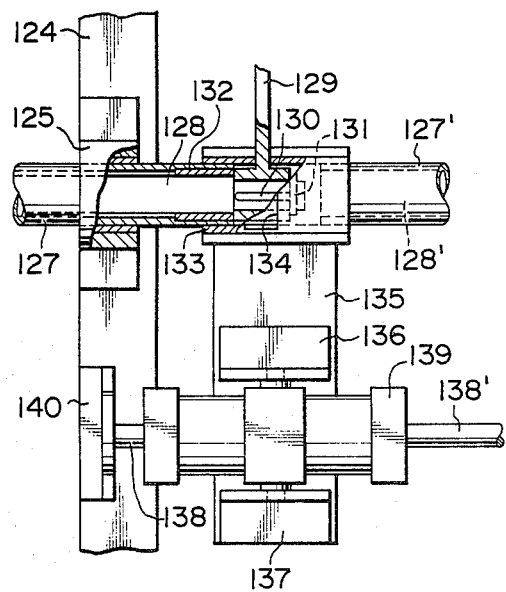
FIG. 18 is a view as viewed from a position indicated by lines XVIII—XVIII of FIG. 17.
Figure 17:
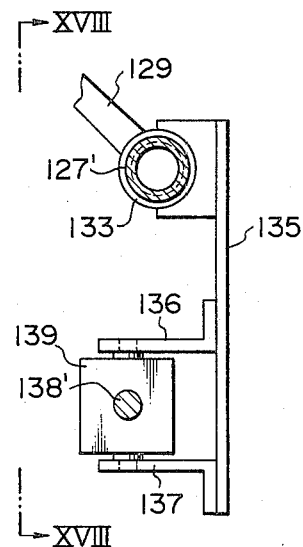
FIG. 17 is an enlarged view taken on lines XVII—XVII of FIG. 14.

In FIGS. 1 to 3, when the original tire bead wires W formed in the previous process are continuously fed to the waiting conveyor 1 while rolling until the foremost tire bead wire W is engaged with the stop member 4, whereupon a suitable detector such as a photoelectric tube (not shown) detects the foremost tire bead wire W, the electric motor 22 is driven to rotate by a signal from the detector so that the endless chain 17 and the pegs 18 and 19 are driven. At this time, the pegs 18 is caused to pick up the foremost tire bead wire W toward its uppermost position in a condition that the axis of the tire bead wire W is held substantially horizontal. When the peg 18 reaches the uppermost position, the electric motor 22 is stopped and the fluid-operated cylinder 32 is actuated to cause the piston rod 33 to retract upwardly so that the lever member 25 is swung through the lever 29 to release the tire bead wire W from the peg 18 and to transfer it onto the first conveyor mechanism 36, wherein the axis of the tire bead wire W becomes substantially vertical. The tire bead wire W is then conveyed by the first conveyor mechanism 36 while urging the detection levers 68 against the compression springs 70 when there is no tire bead wire W stopped by the stopping rods 75 in the forward positions in FIGS. 4 and 5. When another tire bead wire W, on the other hand, occupies the forward position on the conveyor mechanism 36, which is detected by the forward detection lever 68, the tire bead wire W is stopped by the stopping rod 75 through a signal produced by the detection lever 68. When the tire bead wire W is then conveyed to the stop means 40, the tire bead wire W is stopped by the rollers 41. At this time, the fluid-operated cylinder 59 is actuated to cause the tire bead wire W to move toward the positioning mechanism 77 shown in FIGS. 9 and 10. When another tire bead wire W, on the other hand, occupies the positioning mechanism 77, which is detected by a suitable detector (not shown), the fluid-operated cylinder 46 is actuated to cause the piston rod 47 to retract upwardly so that the rollers 41 are lifted to allow the tire bead wire W to pass through the stop means 40 toward an additional forward stop means (not shown) above the first conveyor mechanism 36. The fluid-operated cylinder 59 immediately actuates the piston rod 59 to retract backwardly until it resumes its retracted position after the piston rod 59 is projected forwardly. When the tire bead wire W is pushed by the fluid-operated cylinder 59, it enter the positioning mechanism 77 and is received by the receiving members 97. When the fluid-operated cylinder 104 is actuated to cause the piston rod 105 to project upwardly, the slider 100 is moved upwardly until the receiving rods 101 and 101' slightly push up the tire bead wire W in FIGS. 9 and 10. At this time, the fluid-operated cylinders 95 are actuated to cause the piston rods 96 to retract backwardly so that the receiving members 97 move backwardly to release the tire bead wire W therefrom. The tire bead wire W released from the receiving members 97 is caught by the receiving rods 101 and 101' which are then moved downwardly until the tire bead wire W reaches its predetermined gripping position with the action of the fluid-operated cylinder 104 being actuated to cause the piston rod 105 to retract downwardly. When the tire bead wire W is then received by the receiving rods 101 and 101' from the receiving members 97, and the piston rod 104 comes to be held in a retracted position, the fluid-operated cylinders 95 are actuated to cause the piston rods 96 to project forwardly for receiving a succeeding tire bead wire W. When the tire bead wire W reaches its predetermined gripping position, it becomes opposing to the bead holding members 114 and 114' shown in FIGS. 13, 14 and 15. The double acting fluid-operated cylinder 117 is then actuated to cause the piston rods 118 and 118' to retract so that the holding members 114 and 114' are swung to cause their forward ends to deflate. The fluid-operated cylinder 139 shown in FIGS. 17 and 18 is then actuated to move the holding members 114 and 114' into the inner periphery of the tire bead wire W which lies at a position shown by a symbol Z in FIG. 14. Thereafter, the double acting fluid-operated cylinder 117 is actuated to swing the holding members 114 and 114' to cause their forward ends to inflate so that the tire bead wire W is held or gripped by the holding members 114 and 114'. The fluid-operated cylinder 139 is then actuated to move the tire bead wire W on the holding members 114 and 114' to a position shown by a symbol X, and the fluid-operated cylinder 142 is actuated to cause the piston rod 143 to retract downwardly so that the swingable arm 121 is swung until the tire bead wire W and the holding members 114 and 114' come to be opposing to the front face of the tire bead wire working machine 113. Thereafter, the fluid-operated cylinder 139 is actuated to move the tire bead wire W on the holding members 114 and 114' to the position Z, and the double acting fluid-operated cylinder 117 is actuated to deflate the forward ends of the holding members 114 and 114', so that the tire bead wire W is released from the holding members 114 and 114', whereupon the working machine 113 receives the tire bead wire W from the holding members 114 and 114'. The double acting fluid-operated cylinder 139 is then actuated to move the holding members 114 and 114' to the position X of the tire bead wire W and then to cause the holding members 114 and 114' to resume their initial position opposing to the slider 100. The tire bead wire W is then appropriately worked or treated by the working machine 113. The hook member 150 is then lowered to resume a position where it is able to catch the tire bead wire W shown by a symbol Y in FIG. 20 with the action of the fluid-operated cylinder 153. When the working machine kicks out the worked tire bead wire W therefrom, it is received or caught by the hook member 150. When the fluid-operated cylinder 153 is then actuated to cause the piston rod 154 to retract upwardly, the tire bead wire W resumes its uppermost position. The fluid-operated cylinder 164 is then actuated to cause the piston rod 165 to retract backwardly so that hook member 159 receives the tire bead wire W from the hook member 150. When the hook member 159 is then engaged with the lug 170, the tire bead wire W is released from the hook member 159 in cooperation with the idle roller 184 so that it is received on the endless chains 180 and 180' of the second conveyor mechanism 174 in such a way that the pegs 183 extend through the tire bead wire W. The hook member 159 is then returned with the action of the fluid-operated cylinder 159. The tire bead wire W is then intermittently conveyed to the other end of the second conveyor mechanism 174 by the electric motor 193 shown in FIGS. 21 and 22. When the tire bead wire W reaches the other end of the second conveyor mechanism 174 and the endless chains 180 and 180' are temporally stopped by the electric motor 193, the fluid-operated cylinder 219 is actuated to cause the piston rod 220 to retract downwardly so that the guide rods 215a and 215b are swung to engage with the tire bead wire W through the lever 218. When the electric motor 193 is then driven to rotate and drive the endless chains 180 and 180', the guide rods 215a and 215b receive the tire bead wire W from the second conveyor mechanism 174. The fluid-operated cylinder 219 is then actuated to swing the guide rods 215a and 215b downwardly so that the tire bead wire W is caused to slide down and received by the supporting rods 227 and 227'. When the supporting rods 227 and 227' receive the tire bead wire W from the guide rods 215a and 215b, the fluid-operated cylinder 253 is actuated to swing the levers 248 and 248' to a vertical condition through the lever 252 and then the fluid-operated cylinder 263 is actuated to move the swing levers 248 and 248' toward the bracket 228 so that the tire bead wire W is pushed toward the bracket 228 to join with the tire bead wires W which have been already received on the supporting rods 227 and 227'. The fluid-operated cylinder 263 is then immediately actuated to project the piston rod 264 and the fluid-operated cylinder 253 is also immediately actuated to retract the piston rod 254 until the swing levers 248 and 248' resume their initial positions. When a predetermined number of tire bead wires W are loaded on the supporting rods 227 and 227' through repetition of such cycles, the electric motor 238 is driven to move the endless chains 226 and 226' until succeeding supporting rods 227 and 227' reach their positions opposing to the guide rods 215a and 215b.

A single and complete cycle of operation to convey and collect the tire bead wires in the apparatus embodying the present invention has been described. A number of tire bead wires will be conveyed and collected through repetition of such cycles.

While it has been explained in the foregoing description that the tire bead wires W are fed to and discharged from only one working machine 113, a plurality of such working machines may be provided along with the first conveyor mechanism 36 so that each of the working machines may be associated with a second conveyor mechanism 174, stop means 40 and collecting means for the tire bead wires in order to increase production efficiency if desired.

What is claimed is:
1. An apparatus for conveying and handling a tire bead wire, comprising in combination:
   a first transfer mechanism including transfer means substantially vertically provided for picking up said tire bead wire with its rotation axis being substantially horizontal, and releasing means positioned in the vicinity of the upper portion of said transfer means for releasing said tire bead wire picked up to the upper portion of said transfer means therefrom;
   a first conveyor mechanism including a conveyor positioned in the vicinity of and opposing to said releasing means of said first transfer mechanism for receiving said tire bead wire with its rotational axis being substantially vertical and for conveying said tire bead wire, and a plurality of stop means provided along said conveyor to be equi-distantly spaced apart from each other for temporally stopping said tire bead wire on said conveyor upon another tire bead wire occupying an immediately forward position of said tire bead wire;

at least a positioning mechanism provided substantially vertically for receiving and positioning said tire bead wire, with its rotational axis being substantially horizontal, fed from said conveyor of said first conveyor mechanism to a predetermined gripping position;

at least a second transfer mechanism positioned in the vicinity of said positioning mechanism for gripping said tire bead wire at a predetermined gripping position of said positioning mechanism and for feeding it to a receiving position of a tire bead wire working machine;

at least a third transfer mechanism including lifter means positioned in the vicinity of said working machine for receiving said tire bead wire from said working machine and for lifting it upwardly, and turning means positioned in the vicinity of the upper portion of said lifter means for receiving said tire bead wire from said lifter means and for turning said tire bead wire with its rotational axis being substantially vertical;

at least a second conveyor mechanism having one end positioned in the vicinity of said turning means of said third transfer mechanism for receiving said tire bead wire from said turning means with its rotational axis being substantially vertical and for intermittently conveying it; and at least a collector and carrier mechanism including collector means positioned in the vicinity of the other end of said second conveyor mechanism for receiving said tire bead wire fed from said second conveyor mechanism and for collecting a plurality of tire bead wires, and carrier means for carrying a predetermined number of tire bead wires collected by said collector means.

2. An apparatus as set forth in claim 1, wherein said transfer means of said first transfer mechanism includes an endless member arranged substantially vertically and having at least a peg extending from the periphery thereof for picking up and supporting said tire bead wire fed to a lower portion of said endless member, and a driving arrangement for driving said endless member, and wherein said releasing means includes an urging assembly positioned in the vicinity of the upper portion of said endless member for releasing said tire bead wire from said peg upon said peg reaching an uppermost position.

3. An apparatus as set forth in claim 2, wherein said urging assembly includes a lever member pivotally mounted on a frame, and a fluid-operated cylinder mounted on said frame and having a piston rod the leading end of which is pivotally connected to one end of said lever member for pivoting said lever member to release said tire bead wire on the peg upon the peg reaching an uppermost position.

4. An apparatus as set forth in claim 2, which further comprising a waiting conveyor having a grooved guide frame provided at the lower portion of said endless member, a pair of spaced guide rods positioned above said guide frame and in parallel with each other, and a stop member provided at the end of said guide frame, whereby said tire bead wire rolls along and is guided by said guide frame and said guide rods until said tire bead wire is brought to the halt by means of said stop member at the end of the guide frame.

5. An apparatus as set forth in claim 1, wherein each of said stop means of said first conveyor mechanism includes a detection lever pivotally mounted on one side of said conveyor of said first conveyor mechanism, a tension spring having one end connected to the forward end of said detection lever and the other end fastened to the other side of said conveyor, a stopping rod vertically mounted within said conveyor, and actuator for actuating said stopping rod, whereby said stopping rod is actuated by said actuator to stop said tire bead wire on said conveyor when an immediately forward detection lever detects another tire bead wire occupying an immediately forward position of said tire bead wire.

6. An apparatus as set forth in claim 5, wherein said stop means further includes a plurality of guide rollers vertically rotatably mounted on the other side of said conveyor for preventing said tire bead wire from being dropping from said conveyor upon said detection levers urging said tire bead wire on said conveyor with said tension springs.

7. An apparatus as set forth in claim 1, wherein said positioning mechanism includes guide means for guiding said tire bead wire fed from said conveyor of said first conveyor mechanism, a pair of receiving members mounted on the upper portion of a frame to be horizontally spaced apart from each other for receiving said tire bead wire fed from said conveyor of said first conveyor mechanism, a pair of actuator means connected to respective receiving members to project and retract said receiving member toward and away from the path of said tire bead wire, a slider vertically slidably mounted on said frame below said receiving members and having a pair of horizontally projecting receiving rods with the horizontal width being smaller than that of said receiving members, and additional actuator means connected to said slider for vertically sliding said slider, whereby said receiving rods receive said tire bead wire on said receiving member at their uppermost positions and position said tire bead wire by sliding said slider with the action of said additional actuator means.

8. An apparatus as set forth in claim 1, wherein said second transfer mechanism includes a swingable arm provided between said positioning means and said tire bead wire working machine and having the forward end swingable toward and away from said positioning mechanism and said working machine, sliding means for sliding the forward end of said swingable arm toward and away from the front faces of said positioning mechanism and said working machine, and holding means mounted on said swingable arm for holding said tire bead wire received from said positioning mechanism and for releasing said tire bead wire therefrom to be fed to said working machine.

9. An apparatus as set forth in claim 8, wherein said holding means includes at least a pair of holding members pivotally mounted on said swingable arm, and a double-acting actuator connected to said holding members for concurrently actuating said holding members to inflate and deflate.

10. An apparatus as set forth in claim 8, wherein said second transfer mechanism further includes a swingable shaft having one end securely connected to said swingable arm, a hollow shaft slidably supported by a frame and accommodating therein said swingable shaft, actuator means mounted on said frame for actuating said swingable shaft to pivot around its own axis, and additional actuator means mounted on said frame for actuating said hollow shaft together with said swingable shaft to move the forward end of said holding means toward and away from the front faces of said positioning mechanism and said working machine upon said swingable arm being opposing to said positioning mechanism and said working machine.

11. An apparatus as set forth in claim 1, wherein said lifter means of said third transfer mechanism includes a first hook member, a first actuator vertically mounted on a supporting frame and having a first actuating rod connected to said first hook member for vertically lifting said tire bead wire received on said first hook member from said working machine, and wherein said turning means includes an idle roller disposed opposingly to the path of said tire bead wire, a slider horizontally slidably mounted on said supporting frame, a second hook member pivotally mounted on the lower portion of said slider and having the path substantially horizontal with its one end connected to the uppermost position of the path of said first hook member, a second actuator horizontally mounted on said supporting frame and having a second actuating rod connected to said slider for moving said second hook member toward and away from the uppermost position of the path of said first hook member, and a lug mounted on said supporting frame to be engageable with the second hook member at the other end of the path of said second hook member for facilitating the release of said tire bead wire from said second hook member in cooperation with said idle roller by pivoting said second hook member upon said hook member reaching the other end of the path of said second hook member.

12. An apparatus as set forth in claim 1, wherein said second conveyor mechanism includes a pair of endless chains horizontally spaced apart from each other and intermittently driven by an intermittently rotating drive source, each of said endless chains having a plurality of pegs securely mounted on the outer periphery thereof for conveying said tire bead wire.

13. An apparatus as set forth in claim 1, wherein said collector means of said collector and carrier mechanism includes at least a guide rod pivotally mounted on a frame, opposing to the other end of said second conveyor mechanism for receiving said tire bead wire conveyed to the other end of said second conveyor mechanism, an actuator mounted on said frame for pivoting said guide rod, at least a supporting rod disposed opposingly to said guide rod for receiving said tire bead wire received on said guide rod, a collector disposed opposingly to said supporting rod for joining and collecting said bead wires on said supporting rod, and urging means for moving said collector along said supporting rod.

14. An apparatus as set forth in claim 1, wherein said collector means of said collector and carrier mechanism includes at least a guide rod pivotally mounted on a frame, opposing to the other end of said second conveyor mechanism for receiving said tire bead wire conveyed to the other end of said second conveyor mechanism, an actuator mounted on said frame for pivoting said guide rod, at least a supporting rod disposed opposingly to said guide rod for receiving said tire bead wire received on said guide rod, a collector disposed opposingly to said supporting rod for joining and collecting said bead wires on said supporting rod, and urging means for moving said collector along said supporting rod, and wherein said carrier means of said collector and carrier mechanism includes at least an endless chain horizontally supporting a plurality of supporting rods for carrying said tire bead wires collected thereon.

15. An apparatus as set forth in claim 1, which further comprising at least a stop mechanism above said conveyor of said first conveyor mechanism for stopping said tire bead wire on said conveyor upon said tire bead wire not occupying said positioning means, and an urging mechanism mounted on said conveyor mechanism for urging and feeding said tire bead wire onto said positioning mechanism upon said stop mechanism stopping said tire bead wire.

16. A method of conveying and handling a tire bead wire, comprising transferring said tire bead wire one by one from a tire bead wire waiting position to a first conveyor mechanism disposed above said tire bead wire waiting position, temporally stopping said tire bead wire on said feed conveyor mechanism for adjusting the timing of feeding said tire bead wire to a following process, transferring said tire bead wire on said first conveyor mechanism to a gripping position, holding said tire bead wire conveyed to the gripping position and transferring it to a receiving portion of a tire bead wire working machine for appropriately working said tire bead wire, receiving said tire bead wire from said working machine and transferring it to a second conveyor mechanism, conveying said tire bead wire to the end of said second conveyor mechanism by intermittently driving said second conveyor mechanism, collecting a predetermined number of tire bead wires conveyed to the end of said second conveyor mechanism onto a collector actuating correspondingly to said second conveyor mechanism, and carrying said tire bead wires collected on said collector to a following process.

* * * * *